(12) United States Patent
    Fonte-Ruíz (10) Patent No.: US 8,176,711 B2
(45) Date of Patent: May 15, 2012

(54) MACHINE FOR HORIZONTALLY MANUFACTURING FLEXIBLE SHEET MATERIAL PACKAGINGS WITH OUTSIDE CHAMBER

(75) Inventor: Josep Fonte-Ruíz, Sant Quirze del Vallès (ES)

(73) Assignee: Proaseptic Technologies S.L.U., Barcelona (ES)

( * ) Notice: Subject to any disclaimer, the term of this patent is extended or adjusted under 35 U.S.C. 154(b) by 416 days.

(21) Appl. No.: 12/320,362

(22) Filed: Jan. 23, 2009

(65) Prior Publication Data
    US 2010/0189831 A1    Jul. 29, 2010

(51) Int. Cl.
    *B65B 31/02*    (2006.01)
(52) U.S. Cl. .................. 53/86; 53/425; 53/426; 53/431; 53/455; 53/110; 53/511; 53/562; 53/133.1
(58) Field of Classification Search .......... 53/425, 53/426, 431, 450, 455, 456, 79, 86, 110, 53/510, 511–512, 520, 558, 562, 568, 264, 53/133.1, 133.2, 133.3
    See application file for complete search history.

(56) References Cited

U.S. PATENT DOCUMENTS

| | | | | | |
|---|---|---|---|---|---|
| 3,911,640 | A | * | 10/1975 | Rausing | 53/426 |
| 4,014,158 | A | * | 3/1977 | Rausing | 53/167 |
| 4,225,556 | A | * | 9/1980 | Lothman et al. | 422/28 |
| 4,396,582 | A | * | 8/1983 | Kodera | 422/300 |
| 4,656,813 | A | * | 4/1987 | Baldini et al. | 53/410 |
| 4,783,947 | A | * | 11/1988 | Posey et al. | 53/167 |
| 5,069,017 | A | * | 12/1991 | Fabricius | 53/426 |
| 5,493,845 | A | * | 2/1996 | Adolf et al. | 53/410 |
| 6,101,786 | A | * | 8/2000 | Lees | 53/167 |
| 6,957,523 | B2 | * | 10/2005 | Siccardi | 53/425 |
| 7,685,794 | B2 | * | 3/2010 | Nagatani et al. | 53/425 |

FOREIGN PATENT DOCUMENTS

| | | |
|---|---|---|
| EP | 1 245 493 A1 | 10/2002 |
| EP | 1 743 839 A1 | 1/2007 |
| ES | 2 068 463 | 5/1992 |
| ES | 2 127 939 | 5/1996 |
| ES | 2 255 815 | 7/2006 |
| ES | 1 066 615 | 2/2008 |
| WO | 2005/120960 A1 | 12/2005 |

\* cited by examiner

*Primary Examiner* — Christopher Harmon
(74) *Attorney, Agent, or Firm* — Staas & Halsey LLP (57) ABSTRACT

Machine for manufacturing flexible sheet material packagings, including an area for feeding a continuous web of flexible sheet material, a preforming area including an area for folding a bottom wall of the packaging, a welding area, an area for filling the packagings, an area for outputting the packagings, a first chemical decontamination treatment area using a gas, arranged between the preforming area and the filling area, and an outside chamber that surrounds the machine at least partially and is depressed atmospherically with respect to the first area. The outside chamber acts as an additional barrier between the first area and the outside.

18 Claims, 8 Drawing Sheets

MACHINE FOR HORIZONTALLY MANUFACTURING FLEXIBLE SHEET MATERIAL PACKAGINGS WITH OUTSIDE CHAMBER

BACKGROUND OF THE INVENTION

1. Field of the Invention

The invention relates to a machine for horizontally manufacturing flexible sheet material packagings.

2. Description of the Related Art

Various machines of the type indicated above are known. So, for example, document WO 2005/120960, published on 22 Dec. 2005, describes a machine of this type. For its part, document EP 1.743.839, published 17 Jan. 2007, describes a machine that uses a gas to decontaminate the flexible sheet material before it is preformed. Other similar machines are described in documents EP 1.245.493, published 2 Oct. 2002, ES 2.068.463, published 13 May 2002, ES 2.255.815, published 1 Jul. 2006, and ES 2.127.939, published 29 May 1996.

Nevertheless, there is a constant demand to increase the useful life of packaged goods, so that they can be stored for a longer time. This requires increasing the quality of the decontamination and/or reducing the risk of possible contamination after packaging.

Also, handling a decontamination gas is a complicated process as usually gases that are more or less toxic or irritant to the human body are used, and therefore there is also a permanent interest in improving and facilitating the handling of the decontaminating gas and increasing the safety of the machine operators.

SUMMARY OF THE INVENTION

The aim of the invention is to overcome these drawbacks. This aim is achieved by a machine of the type indicated above, including an outside chamber that surrounds the machine at least partially and which is depressed atmospherically with respect to the first area.

In fact, these machines normally have at least one point for accessing the inside thereof. These access points are necessary for several reasons, such as for example for maintenance tasks, to solve machine stoppages for any unforeseen reason, etc. The access points have a door or openable cover and a fitting frame where a normally airtight closure is established between the cover and the machine structure. These access points always represent a risk of possible sources of contamination, both in the form of bacteria from the outside inwards, and decontaminating agents from the inside outwards, which is a consequent risk for the machine operator. In this respect, it is advantageous that the machine includes an outside chamber that surrounds the machine at least partially and which is depressed atmospherically with respect to the first area. In fact, this way it is possible to create an additional barrier between the inside of the machine and the atmosphere. Also, the main function of this outside chamber is to prevent the decontamination gases from possibly leaking out into the atmosphere. Under these conditions, any possible leakage of decontaminating gas is collected in the outside chamber where it can be extracted by a corresponding pump or fan. Preferably the outside chamber is also depressed with respect to atmospheric pressure. This guarantees that there will be no leakage from the outside chamber to the outside. Preferably the depression of the outside chamber with respect to the atmosphere is between 0 and 1000 Pa, and very preferably between 10 and 500 Pa.

It must be understood that by stating that the outside chamber surrounds the machine at least partially, it is meant that it surrounds at least one part of the machine including the fitting frame of an access point. In this respect, it must be taken into account that the outside chamber can only surround the fitting frame of one access point (or even only one part of the fitting frame), can surround the whole access point (both the fitting frame and the cover or door), or it can even surround larger parts of the machine, for example including several access points in one single outside chamber.

As can be seen, the basic function of the outside chamber is to avoid leakage problems with the access points. In this respect the outside chamber can have various different geometrical shapes. In particular, the outside chamber can completely surround all the various access points on the machine (one single outside chamber for all the access points) or it can only surround some of them. In this latter case it may be that there are other access points which, for whatever reason, do not need an outside chamber or it may be that the machine has a plurality of second chambers, to the extent that the machine could be fitted with second chambers including merely of double joint frames arranged around some and/or each access point or the fitting frames proper.

Advantageously the machine has all its access points arranged on one and the same side and the outside chamber surrounds the machine only on this side. Effectively, grouping the access points in this way simplifies the geometrical shape of the outside chamber.

Preferably the machine includes, in addition:

a second chemical decontamination treatment area where the second treatment area is arranged before the preforming area, an inside chamber that extends between the second treatment area and the first treatment area, with the inside chamber being full of a second decontaminating gas, where the second gas in the inside chamber is over pressurized with respect to atmospheric pressure, and preferably, where the outside chamber is also depressed with respect to the inside chamber.

Effectively, this way the decontamination carried out in the second area is maintained in optimum conditions, and the risk of a new contamination occurring when a sheet web moves through the preforming area is avoided. Also, since the second gas in the inside chamber is over pressurized with respect to atmospheric pressure it is guaranteed that, even if there is a leak or hole in the machine, atmospheric air will never enter the inside chamber. This way the inside chamber is an insulator with over pressurized decontaminating gas.

Furthermore, since the outside chamber is also depressed with respect to the inside chamber, leakages of the second decontaminating gas outwards are also avoided.

This way, another possible reason for having two second chambers could be if the first decontaminating gas and the second decontaminating gas were different from one another. Then there could be an outside chamber surrounding the access points in the first area (and, possibly, the filling and output areas) and another outside chamber surrounding the access points in the inside chamber (which will usually comprise the preforming area), since it may be convenient to treat the possible leakages of the first gas and the second gas in a different way.

Nevertheless, it must be noted that the outside chamber is advantageous both if the inside chamber contains a decontaminating gas or not because, at any event, the first area will always contain the first decontaminating gas.

Advantageously the second chemical decontaminating treatment area includes in applying a chemically active decontaminating liquid to the sheet web. Effectively, using a chemically active liquid guarantees that the whole sheet web is treated. Also, using a liquid guarantees that a greater concentration of the decontaminating agent reaches each point of the sheet web. Applying the chemically active liquid to the sheet web before the preforming area means that it is applied to the sheet web when the latter is still completely unwound. Under these conditions, the liquid can reach all the points of the web much more easily than if the web were folded, when corners and angles are formed that are difficult to access. Moreover, it is also easier to remove the liquid once the decontamination has taken place. It must be taken into consideration that using a liquid has the additional advantage that the liquid cleans by mechanically dragging all kinds of dirt, dust, etc. that may be on the web, and this is impossible, or almost impossible to achieve with a gas, considering the flow rates and pressures conventionally used in this type of machines. Another additional advantage is that the liquid can reach and, therefore, disinfect, small scratches that may appear on the web, and which a gas current could not reach.

A preferable embodiment of the invention is obtained when the second area includes a first submersion tank containing the liquid and first guide that introduces the web into the tank so that the liquid is applied by immersing the web in said liquid.

Alternatively, the second area includes a first decontaminating compartment which houses a first sprayer and a first guide that introduces the web into the first compartment so that the liquid is applied by spraying the liquid on to said web. This application could be performed on only one of the web surfaces, specifically on the inner surface, which is the one that will have difficulty accessing corners and angles when the web is folded. Nevertheless, preferably the liquid is applied to both web surfaces.

At any event, both solutions have the advantage that they do not affect the machine's productivity, as the areas can be made longer or shorter depending on the desired contact time with the decontaminating agent without affecting the machine cycle time.

In addition, it is particularly advantageous that the first gas in the first area is over pressurized with respect to the pressure in the inside chamber, as this way a flow is established extending from the first area to the inside chamber. It must be taken into account that the first area is just before the packaging filling area, where maximum septic conditions must be observed. Generally, it is particularly advantageous that the first area be over pressurized with respect to atmospheric pressure as this minimizes the risk of contamination through contaminated air entering the first area, either through possible access points or through any other point that may have a hole or porosity connected directly or indirectly with the atmosphere. Preferably the overpressure in the first area with respect to atmospheric pressure is between 5 and 500 Pa, and very preferably between 10 and 100 Pa.

Both the first gas and the second gas must be chemically active as decontaminating agents. This can be achieved in various ways, all compatible with this invention. In practice, the most usual is that these gases include of a mixture of various components, where at least one of them is the real decontaminating agent, and the other components are essentially responsible for acting as a vehicle for transporting the active components. Advantageously, the first gas and/or the second gas include $H_2O_2$ (hydrogen peroxide) in a gaseous state as the decontaminating agent.

Also, the liquid must be chemically active as a decontaminating agent, which can also be obtained in various ways, all compatible with this invention. Also in the case of the liquid, it is often a mixture of components, where at least one of them is the real decontaminating agent. As in the case of the gas, it is advantageous that the liquid includes $H_2O_2$ in a liquid state as the decontaminating agent.

Another advantageous embodiment of the machine according to the invention is obtained when the second chemical decontamination treatment area employs a third gas that is chemically active as a decontaminating agent, which, preferably, includes $H_2O_2$ in a gaseous state. In this case, the whole machine performs the complete web decontaminating process by using gas.

Preferably the decontaminating gases are produced in external equipment, so that the previously produced decontaminating gas is injected into the machine (in the first area and/or in the inside chamber and/or in the second area). This ensures a more uniform distribution than if a decontaminating liquid is sprayed inside the machine to evaporate and be distributed inside the machine. Also, this system provides for regulating the concentration of decontaminating agent in the decontaminating gas, so that in each case the desired concentration is applied uniformly throughout the compartment in question.

Generally, the decontaminating gas is, inside the corresponding compartment, at a temperature of between 40° C. and 70° C., particularly when the decontaminating agent is $H_2O_2$. For its part, the decontaminating liquid is preferably at a temperature of between 40° C. and 80° C., particularly when the decontaminating agent is $H_2O_2$. In this respect, it must be understood that when it is stated that the gases must be chemically active as decontaminating agents, it must be understood that they must be chemically active as microbiological decontaminating agents and within the range of temperatures between 40° C. and 70° C. Similarly, it must be understood that the decontaminating liquid is chemically active as a microbiological decontaminating agent within the range of temperatures between 40° C. and 80° C. Also it must be clear that both hot air and water vapor are considered to be excluded from this definition of decontaminating gas.

Usually the packagings have top stoppers. These stoppers are usually assembled onto the packaging once the latter has been filled with the corresponding product. This stage of assembling the stopper onto the packaging is usually performed in the same machine. In this respect it is advantageous that the machine includes a third chemical decontamination treatment area that applies to said stoppers a second liquid that is chemically active as a decontaminating agent. Effectively, this way the decontaminating (and mechanical cleaning) advantages are also applied via a liquid to the stoppers, which increases the extent of the unit's decontamination.

As in the case of the second chemical decontamination treatment area, the liquid can be applied by submersion or spraying. Therefore, a preferable solution would include, in the third area, a second submersion tank that contains the second liquid and a second guide that introduce the stoppers into the second tank so that the second liquid is applied through submersion, whereas another preferable solution would include in the third area having a second decontamination compartment which houses a second sprayer and a second guide that introduce the stoppers into the second compartment so that the second liquid is applied by spraying it onto the stoppers. In either of the two cases, preferably the second liquid includes hydrogen peroxide as the decontaminating agent.

Advantageously, when the packagings include top stoppers, the machine includes an area for attaching the stoppers to the packaging, where the stopper attachment area, in turn, includes a first area for prewelding the stopper to the sheet material, a second area for welding the stopper to the sheet material and a third area for welding the sheet material arranged on the sides of the stopper.

Another known way of decontaminating packagings is via ultraviolet radiation (UV rays) of the sheet material web and/or the packaging in any of its formation stages. Logically, this method of decontamination is completely compatible with this invention, and therefore it is possible to include one or more UV radiation stages in any part of the process, such as for example in the preforming area. Also, the UV radiation step can be added to an area where there is no gas that is chemically active as a decontaminating agent or, on the contrary, it can be added to an area where there is also a decontaminating gas, although in the latter case care should be taken to ensure that the UV rays do not negatively affect the decontaminating properties of the gas.

BRIEF DESCRIPTION OF THE DRAWINGS

Other advantages and characteristics of the invention will be appreciated from the following description, which provides a non-limiting description of some preferable embodiments of the invention, with reference to the accompanying drawings, in which.

DESCRIPTION OF THE EMBODIMENTS

Figure 1:
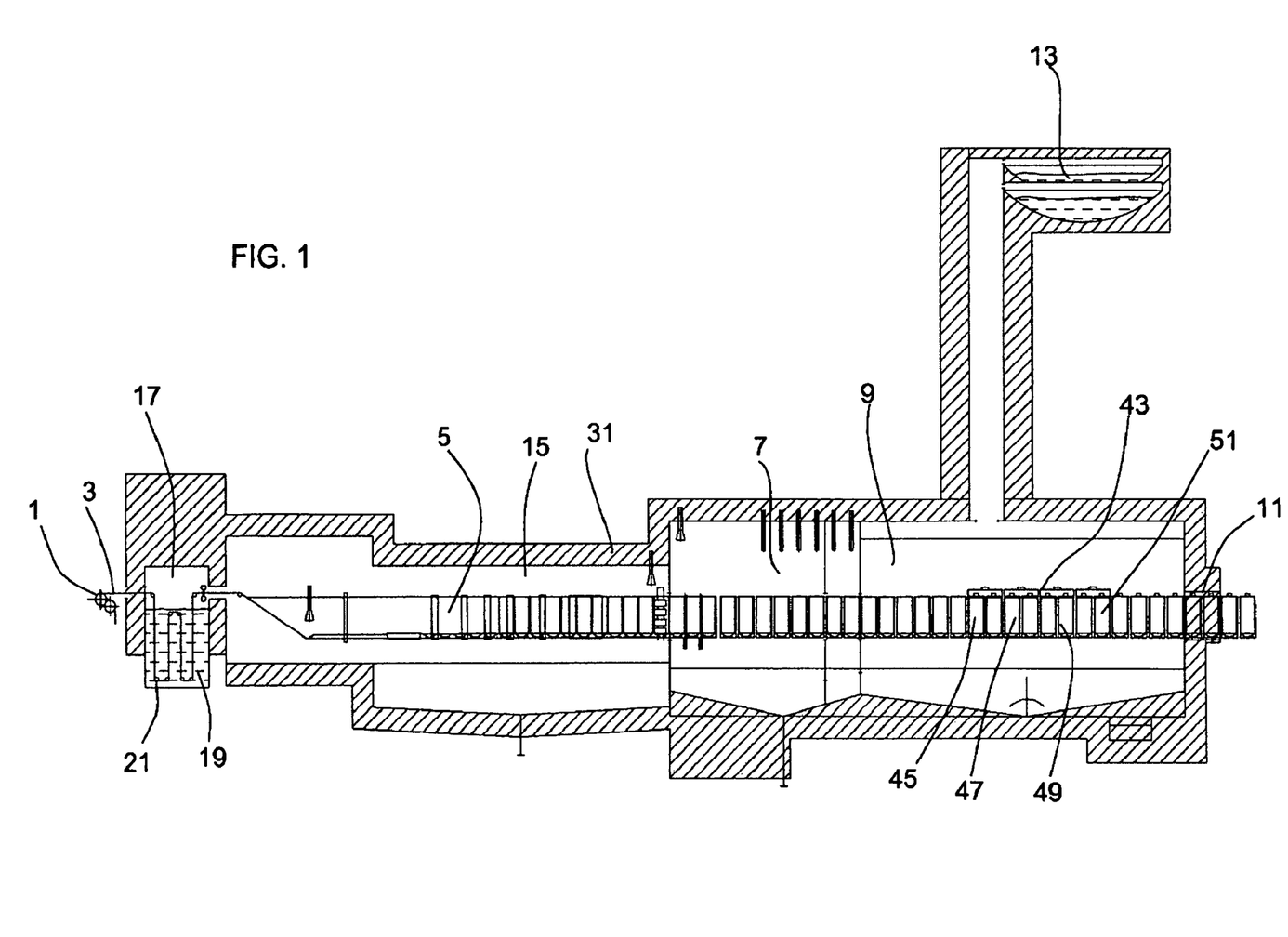
FIG. 1, a diagrammatical front view, of a longitudinal section of a machine according to the invention.

FIG. 1 shows a machine for horizontally manufacturing flexible sheet material packagings according to the invention. The machine has an area 1 for feeding a continuous sheet material web 3. This web 3 is preformed in a preforming area 5 where it is folded so as to form a bottom wall of the packaging and sides of the packaging are welded, after which web 3 is cut so that the packagings are separated from each other. Then the packagings enter a first chemical decontamination area 7 with a first gas that is a chemically active decontaminating agent, in particular a gas containing hydrogen peroxide. Once the packagings are decontaminated, they are filled in the filling area 9, the stopper is added and the packagings are removed through the output area 11. The stopper, in turn, passes through a third chemical decontamination 13 treatment area.

First area 7 is full of the first gas and is over pressurized with respect to the atmosphere. Between first area 7 and filling area 9 there are closing devices (a semi-closed wall) which, together with a suitable pressure difference, prevent the first gas from passing into filling area 9 (although air can pass from filling area 9 to first area 7). Filling area 9 is the most sterile area in the whole of the machine, but it can no longer contain gases that may be hazardous to health, and therefore it is full of sterile air. Output area 11 has other closing devices that prevent atmospheric air from entering. Between the preforming area 5 and first area 7 there is a narrow passage. Preforming area 5 is also over pressurized with respect to the atmosphere, but its pressure is lower than first area 7, so that a gas current flow is established extending from first area 7 to preforming area 5. This way preforming area 5 defines an inside chamber 15 that extends throughout the preforming area. In this case, the second decontaminating gas is the same as the first decontaminating gas.

Figure 2:
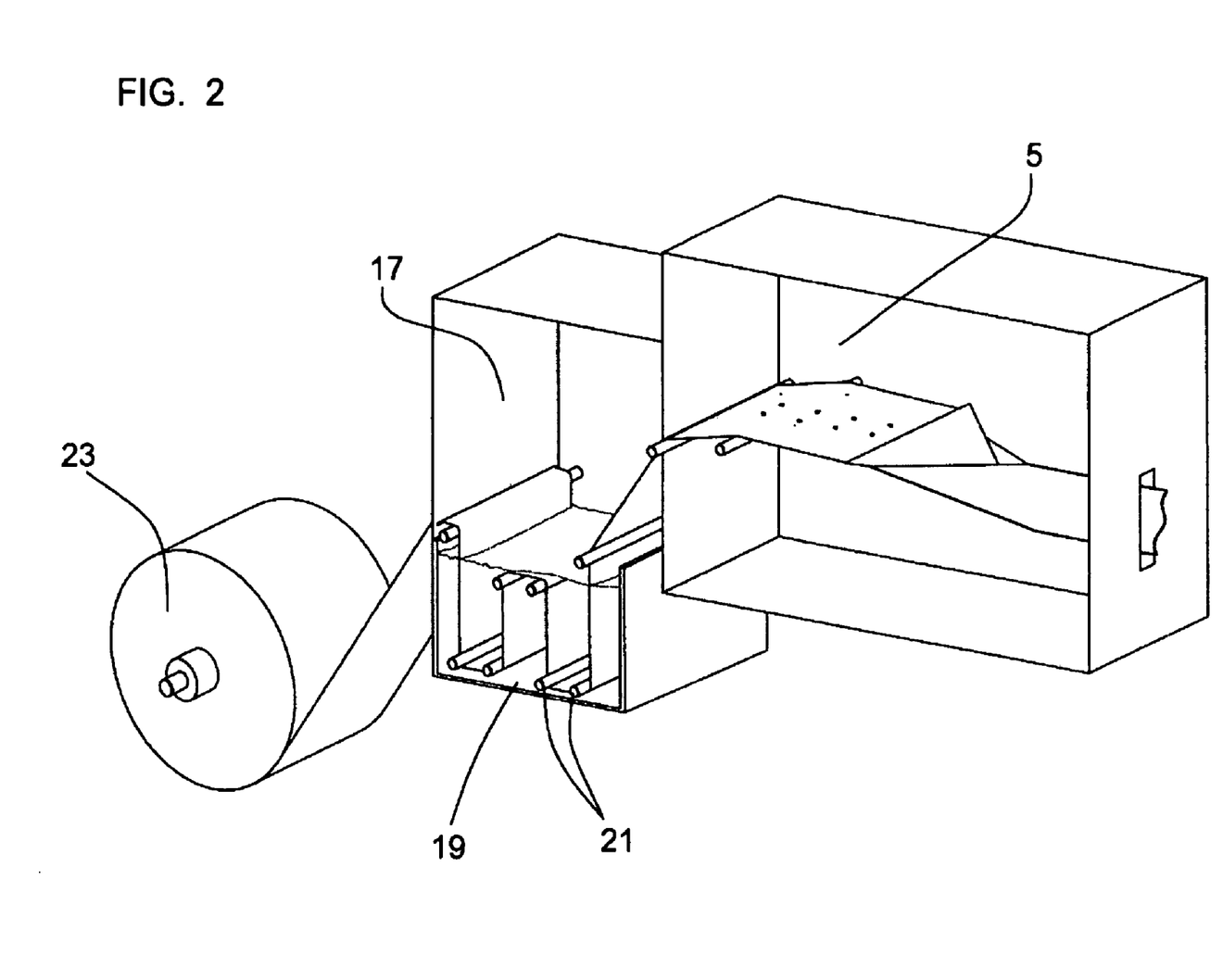
FIG. 2, a diagrammatical perspective view, of a longitudinal section of a second chemical decontamination treatment area according to the invention.
Figure 3A:
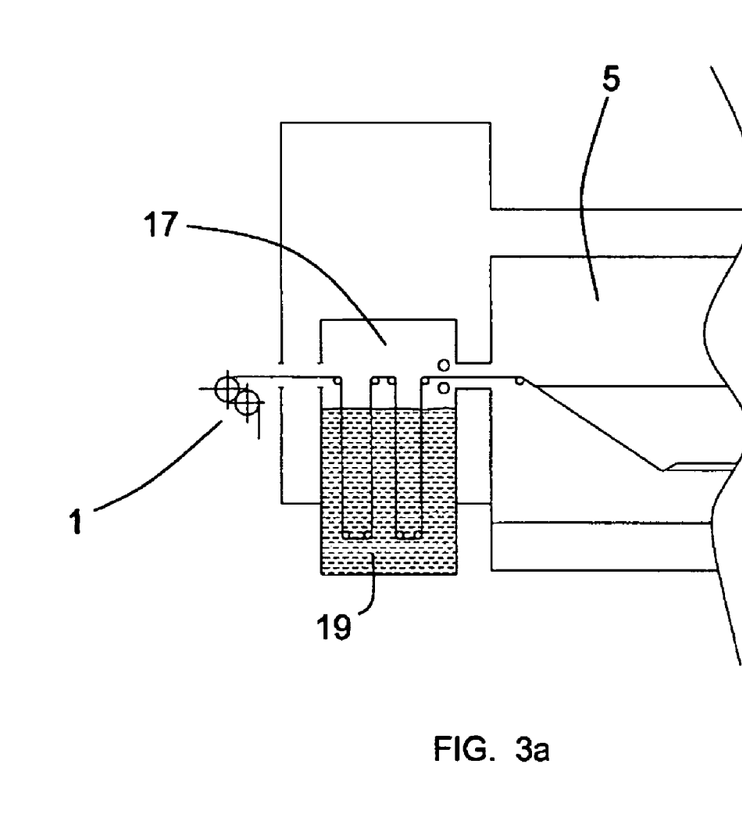
FIGS. 3a and 3b, diagrammatical front views, of a second submersion (FIG. 3a) and spray (FIG. 3b) treatment area.
Figure 3B:
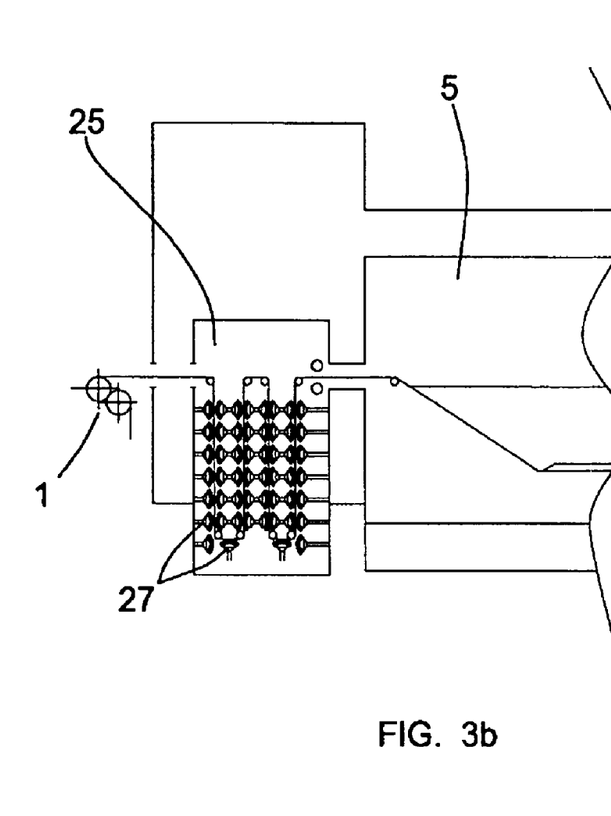

Between feeding area 1 and preforming area 5 there is a second chemical decontamination treatment area 17, where web 3 is immersed in a first submersion tank 19 containing a decontaminating liquid that has hydrogen peroxide. A first guide 21, including some rollers, guide web 3 through first tank 19. FIG. 2 shows this second area 17 in greater detail, where a reel 23 can also be seen, which carries web 3 of flexible sheet material to the machine. FIGS. 3a and 3b show a comparison between the alternative of using a first submersion tank 19 or using a first decontamination compartment 25 with a first sprayer 27. Other ways are possible for applying to web 3 the liquid that is chemically active as a decontaminating agent, such as for example using a liquid curtain. Generally any application method is suitable for the general concept of the invention. Preferably inside chamber 15 extends between second chemical decontamination treatment area 17 and first treatment area 7. So, recently disinfected web 3 is not in contact at any time with the atmosphere or, generally, with a non-decontaminated environment.

Additionally, by using a first tank 19 the liquid bath proper can be used as an airtight barrier between inside chamber 15 and the outside. Effectively, by adding a divider that extends from the inner top part of second chemical decontamination area 17 and has its bottom end immersed in the decontaminating liquid, it is possible to insulate inside chamber 15 and the part of second area 17 adjacent thereto with respect to the part of second area 17 adjacent to feeding area 1, and, therefore, with respect to the outside.

With this embodiment, once web 3 has entered second area 17, at no time does it leave a sterile atmosphere, as the whole of the inside of the machine is in a decontaminated or sterile atmosphere. Consequently, in first area 7 it is no longer necessary to inject the first gas inside each preformed packaging (as normally occurs in the state of the art machines), as instead it suffices that the first gas is injected inside first area 7 in a general manner.

Figure 4A:
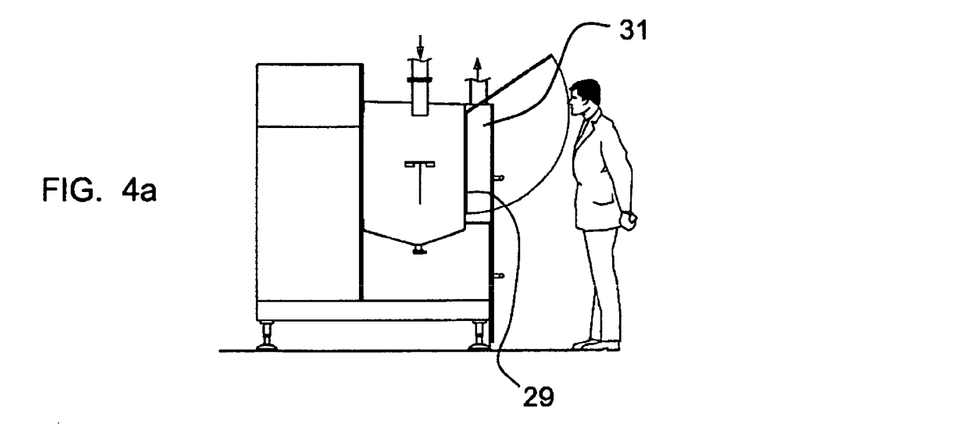
FIGS. 4a, 4b and 4c, side views of cross-sections of the machine in FIG. 1 showing three possible alternative geometrical shapes of the second outside chambers.
Figure 4B:
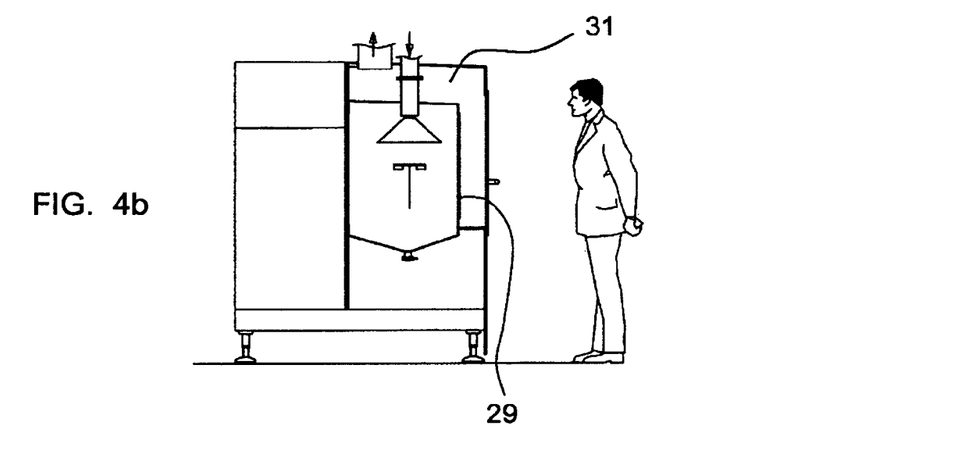
Figure 4C:
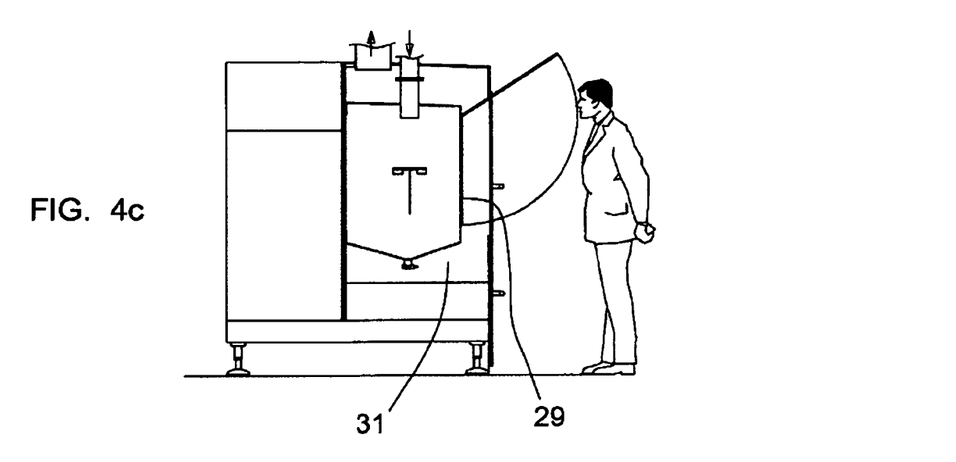

The machine has a plurality of access points 29, needed to access inside the machine to correct any incidents, machine stoppages, or maintenance tasks, etc. These access points 29 are usually distributed along the whole machine, so that all areas of the machine can be accessed. FIGS. 4a, 4b and 4c show some resolution alternatives for access points 29. In FIG. 4a access point 29 has an outside chamber 31 that only extends along the side of the machine. In FIG. 4b, outside chamber 31 surrounds the machine both on the side and the top therefore and in FIG. 4c outside chamber 31 surrounds the machine on the side, top and bottom thereof.

Figure 5:
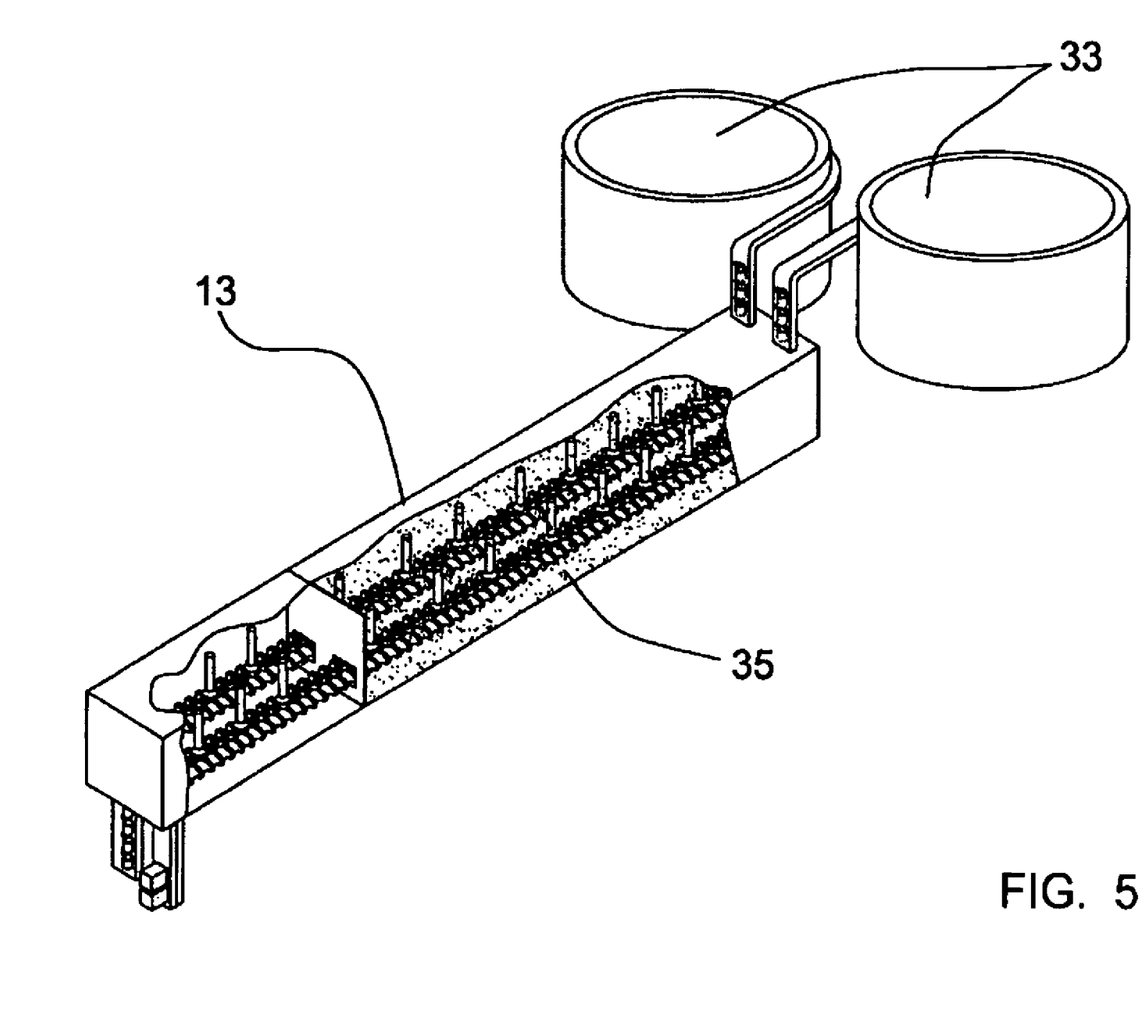
FIG. 5, a perspective view, partially sectioned of a third chemical decontamination treatment area of the stoppers via spraying.
Figure 6:
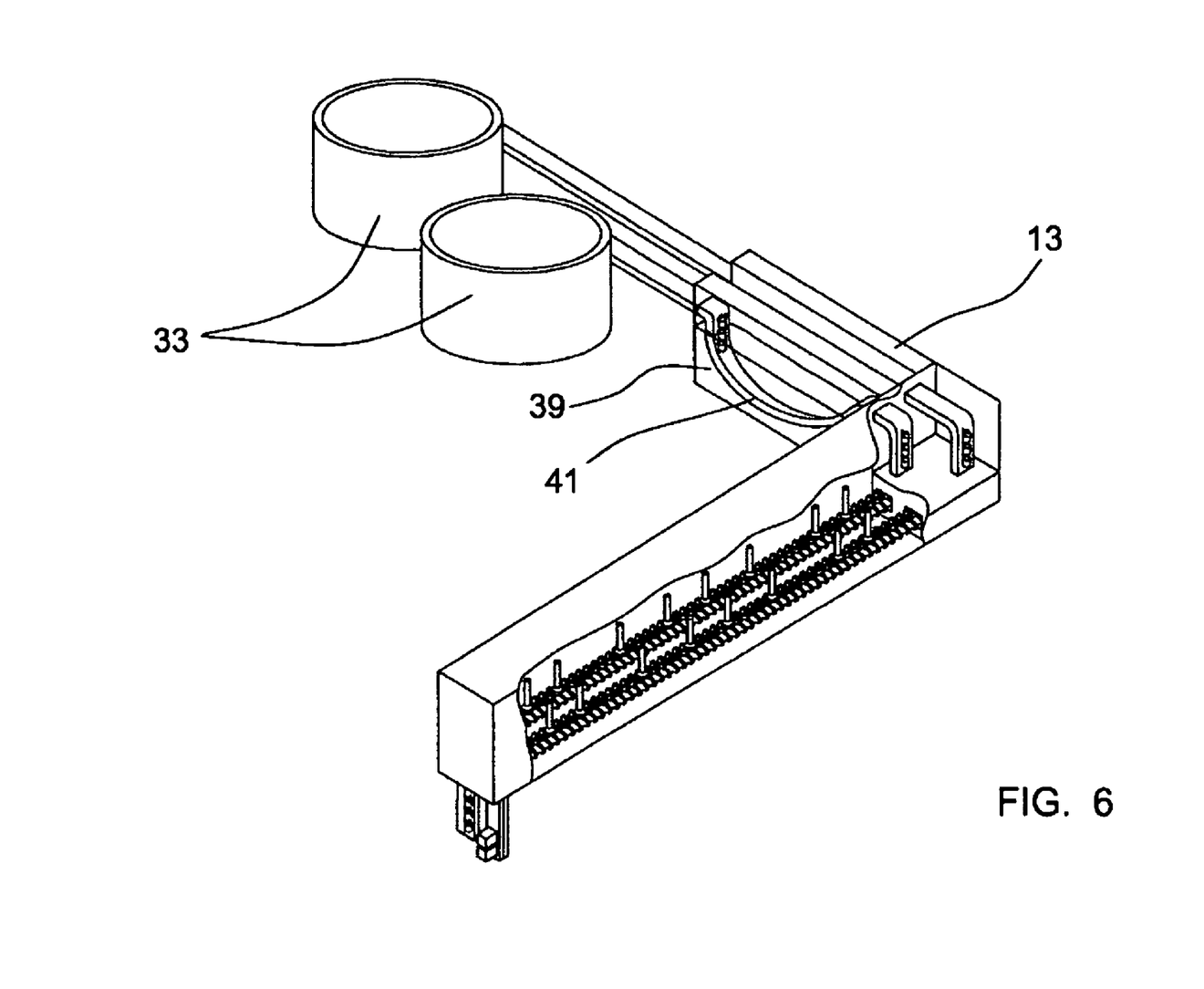
FIG. 6, a perspective view, partially sectioned of a third chemical decontamination treatment area of the stoppers through submersion.

FIGS. 5 and 6 show two alternative embodiments of the third chemical decontamination treatment area 13 for the stoppers. FIG. 5 shows how the stoppers are suitably selected and orientated by vibrating bowls 33 and then introduced into a second decontamination compartment 35 which houses a second sprayer that applies to the stoppers, via spraying, a second liquid that is chemically active as a decontaminating agent, normally an aqueous solution of hydrogen peroxide. For its part, FIG. 6 shows how the stoppers are introduced into a second submersion tank 39 that contains the second decontaminating liquid. In this case, a second guide 41 is a U-shaped guide that provides for introducing the stoppers and removing them from the second tank 39. Following the submersion, there is a stopper aeration step, where the latter are dried before being assembled onto the packagings. Both in the case of application through spraying or submersion, it is advantageous that the access points to this part of the machine have an outside chamber.

As in the case of second chemical decontamination area 17, if a third chemical decontamination treatment area 13 is used for the stoppers, including a second submersion tank 39, the decontaminating liquid can be used as an air-tight barrier between the outside and the inside of the machine. Generally, it must be considered that, both in second area 17 and in third area 13 using a submersion tank or using sprayers are non-exclusive alternatives, and they can also be combined together.

Figure 7:
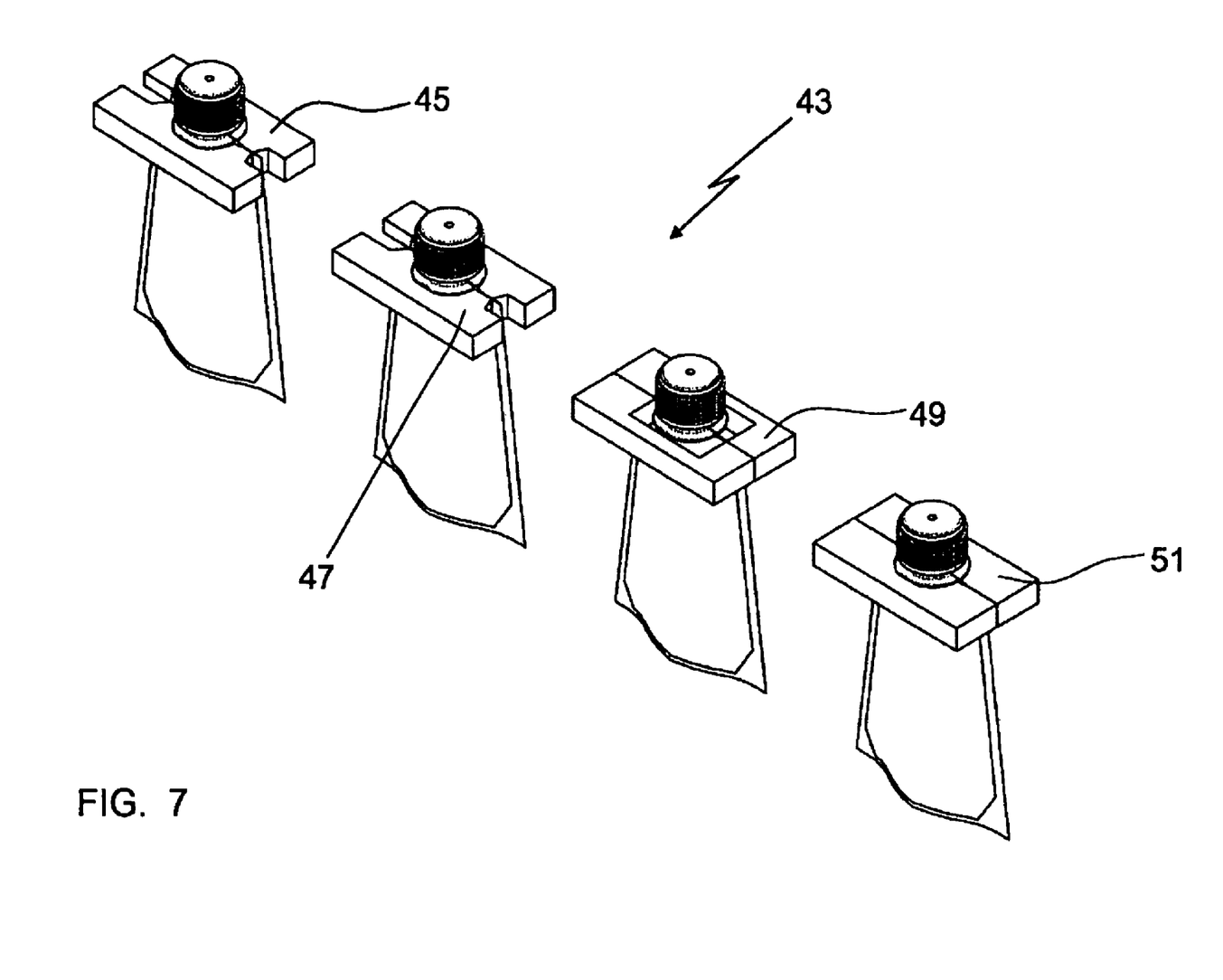
FIG. 7, a perspective view of the sequence followed in a stopper attachment area according to the invention.

FIG. 7 shows in detail the stages of attaching the stoppers to the packagings. Stopper attachment area 43 includes a first stopper prewelding area 45 where the stopper is preattached to the packaging, a second stopper welding area 47 where the stopper is definitively attached to the packaging, and a third stage 49 for welding the sheet material arranged on the stopper sides to the packaging. This sheet material has been preheated during the stopper prewelding and welding stages, and therefore it is strongly welded in one stage. Finally, there is a fourth unit cooling stage 51, which is a conventional cooling stage.

Figure 8:
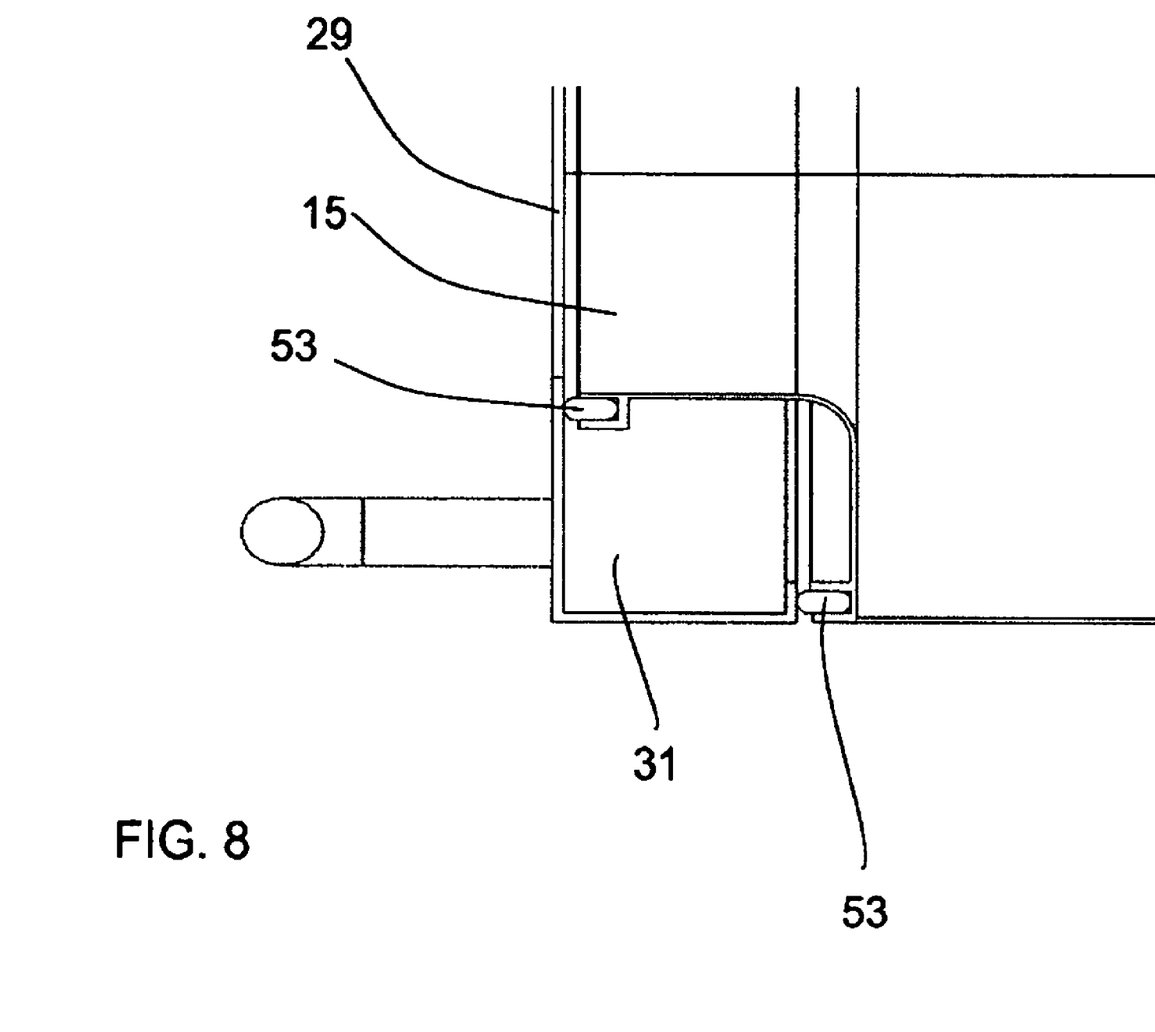
FIG. 8, a diagrammatic view of an outside chamber shaped with a double joint frame.

FIG. 8 shows a diagrammatic view of an example of an outside chamber 31, shaped as a frame with two joints 53, arranged around one access point 29 to inside chamber 15.

What is claimed is:

1. Machine for manufacturing flexible sheet material packaging, comprising:
    an area for feeding a continuous web of flexible sheet material,
    a preforming area including an area for folding a bottom wall of said packaging and a welding area,
    an area for filling said packaging,
    an area for outputting said packaging,
    a first chemical decontamination treatment area using a first gas that is chemically active as a decontaminating agent, wherein said first treatment area is arranged between the preforming area and the filling area;
    an outer chamber that surrounds said machine at least partially and is depressed atmospherically with respect to said first treatment area; and
    a plurality of access points on a same side of the machine and said outer chamber surrounds said plurality of access points on said side of the machine.

2. Machine according to claim 1, wherein said outer chamber's atmospheric pressure is between 0 and 1000 Pa.

3. Machine according to claim 1, further comprising:
    a second chemical decontamination treatment area arranged before the preforming area; and
    an inner chamber that extends between said second treatment area and said first treatment area, where the inner chamber includes a second decontaminating gas, where said second gas in said inner chamber is over pressurized with respect to atmospheric pressure, and where said outer chamber is also depressed atmospherically with respect to the inner chamber.

4. Machine according to claim 3, wherein said second area applies to said web of flexible sheet material a liquid that is chemically active as a decontaminating agent.

5. Machine according to claim 4, wherein said second treatment area comprises a submersion tank containing said liquid and a guide that introduces said web into said tank so that said liquid is applied by immersing said web in said liquid.

6. Machine according to claim 4, wherein said second treatment area comprises a first decontamination compartment which houses a first sprayer and a guide that introduces said web into said first compartment so that said liquid is applied by spraying said liquid onto said web.

7. Machine according to claim 3, wherein said first gas in said first treatment area is over pressurized with respect to the pressure of the second gas in said inner chamber.

8. Machine according to claim 1, wherein the first gas in the said first treatment area is over pressurized with respect to atmospheric pressure by between 5 and 500 Pa.

9. Machine according to claim 3, wherein said second treatment area uses a third gas that is chemically active as a decontaminating agent.

10. Machine according to claim 1, further comprising:
    stoppers for the packaging and a stopper chemical decontamination treatment area for applying to said stoppers a liquid that is chemically active as a decontaminating agent.

11. Machine according to claim 10, wherein said stopper treatment area comprises a submersion tank containing said liquid and a guide that introduces said stoppers into said tank so that said liquid is applied by submersion.

12. Machine according to claim 10, wherein said stopper area comprises a decontamination compartment which houses a sprayer and a guide that introduces said stoppers into said compartment so that said liquid is applied by spraying said liquid onto said stoppers.

13. Machine according to claim 1, wherein said packaging comprises stoppers, and an area for attaching said stoppers to said packaging, wherein said stopper attachment area includes a first area for prewelding the stopper to the sheet material, a second area for welding the stopper to the sheet material and a third area for welding the sheet material arranged on the sides of the stopper.

14. Machine according to claim 2, further comprising:
    a second chemical decontamination treatment area arranged before the preforming area; and
    an inner chamber that extends between said second treatment area and said first treatment area, where the inner chamber includes a second decontaminating gas, where said second gas in said inner chamber is over pressurized with respect to atmospheric pressure, and where said outer chamber is also depressed atmospherically with respect to the inner chamber.

15. Machine for manufacturing flexible sheet material packaging, comprising:
    an area for feeding a continuous web of flexible sheet material,
    a preforming area including an area for folding a bottom wall of said packaging and a welding area,
    an area for filling said packaging,
    an area for outputting said packaging,
    a first chemical decontamination treatment area using a first gas that is chemically active as a decontaminating agent, wherein said first treatment area is arranged between the preforming area and the filling area;
    at least one access point that provides access from outside the machine to inside the machine; and
    an outer chamber that surrounds at least partially said at least one access point and is depressed atmospherically with respect to said first treatment area.

16. Machine according to claim 15, wherein said outer chamber's atmospheric pressure is between 0 and 1000 Pa.

17. Machine according to claim 15, wherein said at least one access point is a plurality of access points positioned on a same side of the machine and said outer chamber surrounds said plurality of access points on said same side of the machine.

18. Machine according to claim 14, wherein said outer chamber's atmospheric pressure is between 10 and 500 Pa.

* * * * *